United States Patent
Palero et al.

(10) Patent No.: US 12,549,841 B2
(45) Date of Patent: Feb. 10, 2026

(54) METHOD AND APPARATUS FOR PERFORMING SPECTRAL ANALYSIS OF SKIN OF A SUBJECT

(71) Applicant: KONINKLIJKE PHILIPS N.V., Eindhoven (NL)

(72) Inventors: Jonathan Alambra Palero, Waalre (NL); Michel Jozef Agnes, Helmond (NL); Mathivanan Damodaran, 'S-Hertogenbosch (NL); Rieko Verhagen, Vught (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 34 days.

(21) Appl. No.: 18/726,661

(22) PCT Filed: Dec. 28, 2022

(86) PCT No.: PCT/EP2022/087973
§ 371 (c)(1),
(2) Date: Jul. 3, 2024

(87) PCT Pub. No.: WO2023/135021
PCT Pub. Date: Jul. 20, 2023

(65) Prior Publication Data
US 2025/0097562 A1 Mar. 20, 2025

(30) Foreign Application Priority Data
Jan. 11, 2022 (EP) .................................... 22151022

(51) Int. Cl.
*H04N 23/56* (2023.01)
*H04N 5/14* (2006.01)
*H04N 23/10* (2023.01)

(52) U.S. Cl.
CPC ............. *H04N 23/56* (2023.01); *H04N 5/145* (2013.01); *H04N 23/125* (2023.01)

(58) Field of Classification Search
CPC ....... H04N 23/125; H04N 23/56; H04N 5/145
See application file for complete search history.

(56) References Cited

U.S. PATENT DOCUMENTS 8,107,750 B2 * 1/2012 Spampinato ........... H04N 23/10
375/240.16
10,113,910 B2 * 10/2018 Brunk ................... G01J 3/2803
(Continued)

FOREIGN PATENT DOCUMENTS

| CN | 109738069 A | 5/2019 |
| CN | 112089403 A | 12/2020 |

(Continued)

OTHER PUBLICATIONS

International Search report and Written Opinion of PCT/EP2022/087973, dated Mar. 14, 2023.

*Primary Examiner* — Antoinette T Spinks

(57) ABSTRACT

According to an aspect, there is provided a method for aligning image frames in a sequence of image frames of a subject. The method comprises controlling (101) one or more light sources to emit multi-spectral light to illuminate the subject, wherein the multi-spectral light comprises at least a first light component having a first illumination wavelength, and a second light component having a second illumination wavelength; controlling (103) a multi-channel imaging device to obtain two or more sequences of image frames of the subject, wherein each sequence of image frames is obtained using a respective light detection channel of the multi-channel imaging device, wherein the multi-channel imaging device comprises a first light detection channel that is responsive to light in a first spectral band to generate a first sequence of frames of the subject, and a second light detection channel that is responsive to light in
(Continued)

a second spectral band to generate respective a second sequence of frames of the subject, wherein the first illumination wavelength is within the first spectral band, and the second illumination wavelength is within the second spectral band; processing (105) the first sequence of frames to calculate motion vectors for each frame, wherein each motion vector represents a movement of the subject between frames in the first sequence; and aligning (107) the frames in the second sequence of frames according to the corresponding determined motion vectors such that the subject is aligned across the frames in the second sequence of frames.

13 Claims, 3 Drawing Sheets

(56) References Cited

U.S. PATENT DOCUMENTS 12,340,590 B2 * 6/2025 Vaziri .................. G06F 3/012

| | | |
|---|---|---|
| 2010/0166300 A1 * | 7/2010 | Spampinato ........... H04N 5/145 382/162 |
| 2012/0277559 A1 | 11/2012 | Kohl-Bareis et al. |
| 2015/0130958 A1 | 5/2015 | Pavani et al. |
| 2016/0187199 A1 * | 6/2016 | Brunk .................. G01J 3/0208 348/89 |
| 2017/0167980 A1 | 6/2017 | Dimitriadis et al. |
| 2017/0176336 A1 | 6/2017 | Dimitriadis et al. |
| 2018/0160953 A1 | 6/2018 | Valsan et al. |
| 2018/0330489 A1 | 11/2018 | Kido |
| 2019/0239752 A1 | 8/2019 | Dumitrescu et al. |

FOREIGN PATENT DOCUMENTS

| | | |
|---|---|---|
| CN | 112258560 A | 1/2021 |
| EP | 0660616 A2 | 6/1995 |
| EP | 3820133 A1 | 5/2021 |

* cited by examiner

METHOD AND APPARATUS FOR PERFORMING SPECTRAL ANALYSIS OF SKIN OF A SUBJECT

CROSS-REFERENCE TO PRIOR APPLICATIONS

This application is the U.S. National Phase application under 35 U.S.C. § 371 of International Application No. PCT/EP2022/087973, filed on Dec. 28, 2022, which claims the benefit of European Patent Application No. 22151022.5, filed on Jan. 11, 2022. These applications are hereby incorporated by reference herein.

FIELD OF THE INVENTION

This disclosure relates to performing spectral analysis of skin of a subject that includes aligning image frames in a sequence of image frames, and in particular to aligning image frames in a sequence of image frames obtained using multi-spectral light.

BACKGROUND OF THE INVENTION

Multi-spectral imaging provides a rich amount of information not readily obtainable from single or triple spectral channel (e.g. Red Green Blue (RGB)) imaging. The advantage is more evident in imaging of complex subjects such as the human skin, for which the detected back-scattered light is modulated by several chromophores in the skin/body, including haemoglobin, melanin, water, lipids, carotenoid and bilirubin.

Reflectance spectroscopy is the study of light as a function of wavelength. It finds many uses in medical applications, material analysis and soil analysis. Reflectance spectroscopy is enabled by the fact that different materials have different absorption and scattering spectra. This also holds for the chromophores in the human skin, such as oxygenated and deoxygenated haemoglobin, carotenoids, melanin, bilirubin, etc. Therefore, reflectance spectroscopy of the human skin allows for a detailed decomposition of the chromophores present. It is also useful to relate detected chromophores to (systemic) health as well as specific skin conditions that cannot be resolved by the human eye.

Reflectance spectroscopy typically observes only the spectrum of a single point or area. When reference is made to multi- or hyper-spectral imaging, a whole grid (or image) is observed at different wavelengths. A specific field of interest is multi-spectral imaging of the human body and face.

Although fast multi-spectral imaging can be implemented using single-shot multi-spectral cameras, these devices are very expensive and not for commercial home use. A cost-effective solution is by using multispectral illumination for which each light wavelength can be sequentially captured or scanned by the imaging device (e.g. camera) from multiple frames.

SUMMARY OF THE INVENTION

A multi-spectral image typically consists of a sequence of image frames, where, for each frame, an object/subject to be imaged is illuminated by light having a specific wavelength. In practice, such a multi-spectral image 'scan' can take up to a few seconds to be completed. This has the disadvantage that there will typically be small movements by the subject (e.g. human) during the scan.

Since the spectrum at a particular spatial location on the subject is typically of interest, it is important that all frames are aligned. For example, a certain point of the face may be imaged while illuminated with light at a wavelength of 440 nm, with that certain point residing at coordinates (X, Y) in the image. This exact same point of the face imaged when illuminated with light at, e.g., 700 nm, should reside at exactly the same coordinates (X, Y) in the image. If this is not the case, e.g. due to movement of the face and/or movement of the imaging device with respect to the face, image alignment (also known as image registration) should be implemented such that the image frames are aligned before any spectral analysis is performed using the image frames.

Conventionally, sequential image frames using non-varying illumination can be easily aligned or registered using simple algorithms. However, image alignment for images of a subject illuminated by different (time-varying) light, i.e. multi-spectral light, is hindered by the fact that the reflectance of skin spectrally varies, and thus images or parts of images at different wavelengths have different spatial contrast and detail.

Therefore there is a need for an improved method and apparatus for performing spectral analysis of skin of a subject that includes aligning image frames of the skin of the subject obtained using multi-spectral light.

According to a first specific aspect, there is provided a method for aligning image frames in a sequence of image frames of a subject. The method comprises controlling one or more light sources to emit multi-spectral light to illuminate the subject, wherein the multi-spectral light comprises at least a first light component having a first illumination wavelength, and a second light component having a second illumination wavelength; controlling a multi-channel imaging device to obtain two or more sequences of image frames of the subject, wherein each sequence of image frames is obtained using a respective light detection channel of the multi-channel imaging device, wherein the multi-channel imaging device comprises a first light detection channel that is responsive to light in a first spectral band to generate a first sequence of frames of the subject, and a second light detection channel that is responsive to light in a second spectral band to generate respective a second sequence of frames of the subject, wherein the first illumination wavelength is within the first spectral band, and the second illumination wavelength is within the second spectral band; processing the first sequence of frames to calculate motion vectors for each frame, wherein each motion vector represents a movement of the subject between frames in the first sequence; and aligning the frames in the second sequence of frames according to the corresponding determined motion vectors such that the subject is aligned across the frames in the second sequence of frames.

According to a second aspect, there is provided a computer program product comprising a computer readable medium having computer readable code embodied therein, the computer readable code being configured such that, on execution by a suitable computer or processor, the computer or processor is caused to perform the method according to the first aspect or any embodiment thereof.

According to a third aspect, there is provided an apparatus configured for aligning image frames in a sequence of image frames of a subject. The apparatus comprises a processing unit configured to control one or more light sources to emit multi-spectral light to illuminate the subject, wherein the multi-spectral light comprises at least a first light component having a first illumination wavelength, and a second light component having a second illumination wavelength; control a multi-channel imaging device to obtain two or more sequences of image frames of the subject, wherein each sequence of image frames and each is obtained using a respective light detection channel of the multi-channel imaging device, wherein the multi-channel imaging device comprises a first light detection channel that is responsive to light in a first spectral band to generate a first sequence of frames of the subject, and a second light detection channel that is responsive to light in a second spectral band to generate a second sequence of frames of the subject, wherein the first illumination wavelength is within the first spectral band, and the second illumination wavelength is within the second spectral band; process the first sequence of frames to calculate motion vectors for each frame, wherein each motion vector represents a movement of the subject between frames in the first sequence; and align the frames in the second sequence of frames according to the corresponding determined motion vectors such that the subject is aligned across the frames in the second sequence of frames.

According to a fourth aspect, there is provided a system configured for aligning image frames in a sequence of image frames of a subject. The system comprises an apparatus according to the third aspect or any embodiment thereof, one or more light sources; and a multi-channel imaging device.

According to a fifth aspect, there is provided a method for performing spectral analysis of skin of a subject. The method comprises (i) aligning image frames in a sequence of image frames of skin of a subject by: controlling one or more light sources to emit multi-spectral light to illuminate the skin, wherein the multi-spectral light comprises at least a first light component having a first illumination wavelength, and a second light component having a second illumination wavelength; controlling a RGB imaging device to obtain two or more sequences of image frames of the skin, wherein each sequence of image frames is obtained using a respective light detection channel of the RGB imaging device, wherein the RGB imaging device comprises a first light detection channel that is responsive to light in a first spectral band to generate a first sequence of frames of the skin, and a second light detection channel that is responsive to light in a second spectral band to generate a respective a second sequence of frames of the skin, wherein the first illumination wavelength is within the first spectral band, and the second illumination wavelength is within the second spectral band; processing the first sequence of frames to calculate motion vectors for each frame, wherein each motion vector represents a movement of the skin between frames in the first sequence; aligning the frames in the second sequence of frames according to the corresponding determined motion vectors such that the skin is aligned across the frames in the second sequence of frames; and (ii) performing spectral analysis of the skin using the aligned second sequence of frames. The first light component is a green light component, the first spectral band is a green spectral band, the second light component is one of a red light component and a blue light component, and the second spectral band is a corresponding one of a red spectral band and a blue spectral band.

According to a sixth aspect, there is provided a computer program product comprising a computer readable medium having computer readable code embodied therein, the computer readable code being configured such that, on execution by a suitable computer or processor, the computer or processor is caused to perform the method according to the fifth aspect or any embodiment thereof.

According to a seventh aspect, there is provided an apparatus configured for performing spectral analysis of skin of a subject. The apparatus comprises a processing unit configured to: (i) align image frames in a sequence of image frames of skin of a subject by: controlling one or more light sources to emit multi-spectral light to illuminate the skin, wherein the multi-spectral light comprises at least a first light component having a first illumination wavelength, and a second light component having a second illumination wavelength; controlling a RGB imaging device to obtain two or more sequences of image frames of the skin, wherein each sequence of image frames and each is obtained using a respective light detection channel of the RGB imaging device, wherein the RGB imaging device comprises a first light detection channel that is responsive to light in a first spectral band to generate a first sequence of frames of the skin, and a second light detection channel that is responsive to light in a second spectral band to generate a second sequence of frames of the skin, wherein the first illumination wavelength is within the first spectral band, and the second illumination wavelength is within the second spectral band; processing the first sequence of frames to calculate motion vectors for each frame, wherein each motion vector represents a movement of the skin between frames in the first sequence; aligning the frames in the second sequence of frames according to the corresponding determined motion vectors such that the skin is aligned across the frames in the second sequence of frames; and (ii) perform spectral analysis of the skin using the aligned second sequence of frames. The first light component is a green light component, the first spectral band is a green spectral band, the second light component is one of a red light component and a blue light component, and the second spectral band is a corresponding one of a red spectral band and a blue spectral band.

According to an eighth aspect, there is provided a system configured for performing spectral analysis of skin of a subject. The system comprises: an apparatus according to the seventh aspect or any embodiment thereof; the one or more light sources; and the RGB imaging device.

These and other aspects will be apparent from and elucidated with reference to the embodiment(s) described hereinafter.

BRIEF DESCRIPTION OF THE DRAWINGS

Exemplary embodiments will now be described, by way of example only, with reference to the following drawings, in which.

DETAILED DESCRIPTION OF THE EMBODIMENTS

Figure 1:
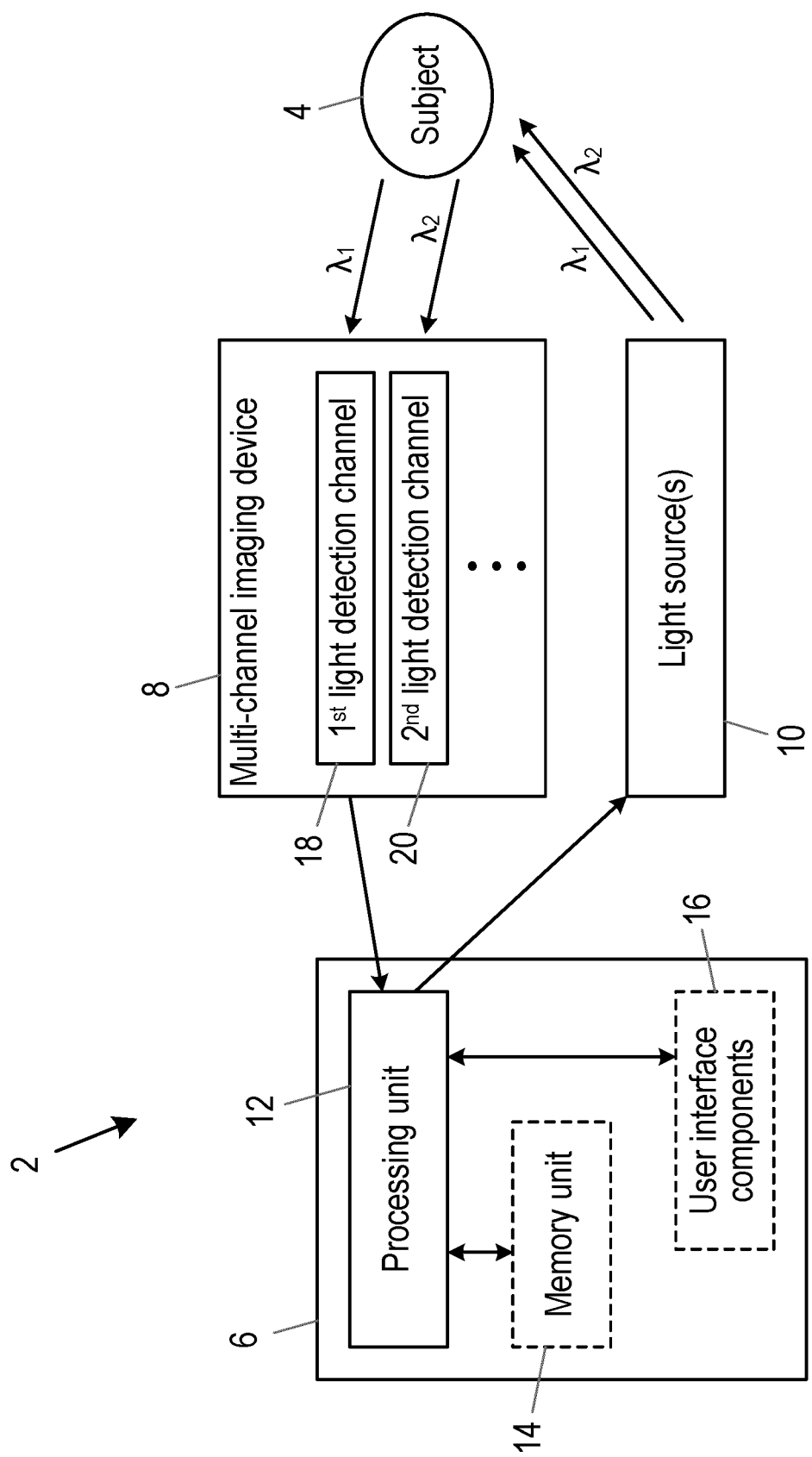
FIG. 1 is a simplified illustration of a system for obtaining and aligning image frames of a subject according to an embodiment.

FIG. 1 is a simplified illustration of a system 2 for obtaining and aligning image frames of a subject 4 according to an embodiment the techniques described herein. The subject 4 is typically a human subject, although the system 2 and techniques can be used with non-human subjects, and/or objects, where movement of the subject in a sequence of image frames may occur as the image frames are obtained. When used with a human subject 4, the techniques described herein are particularly useful where the obtained image frames are to be spectrally analysed to determine one or more properties of the skin, for example relating to the chromophores present in the skin.

The system 2 generally comprises an apparatus 6, a multi-channel imaging device 8 and one or more light source(s) 10. In the embodiment shown in FIG. 1, the apparatus 6 comprises a processing unit 12, and also optionally comprises a memory unit 14 and/or one or more user interface components 16.

The processing unit 12 is provided to control the operations of the multi-channel imaging device 8 and the light source(s) 10 to illuminate the subject 4 with the required multi-spectral light and to obtain the sequence of image frames of the subject 4. The processing unit 12 also operates according to the techniques described herein to align the image frames in the obtained sequence.

The processing unit 12 can be implemented in numerous ways, with software and/or hardware, to perform the various functions described herein. The processing unit 12 may comprise one or more microprocessors or digital signal processors (DSPs) that may be programmed using software or computer program code to perform the required functions and/or to control components of the processing unit 12 to effect the required functions. The processing unit 12 may be implemented as a combination of dedicated hardware to perform some functions (e.g. amplifiers, pre-amplifiers, analog-to-digital convertors (ADCs) and/or digital-to-analog convertors (DACs)) and a processor (e.g., one or more programmed microprocessors, controllers, DSPs and associated circuitry) to perform other functions. Examples of components that may be employed in various embodiments of the present disclosure include, but are not limited to, conventional microprocessors, DSPs, application specific integrated circuits (ASICs), field-programmable gate arrays (FPGAs), hardware for implementing a neural network and/or so-called artificial intelligence (AI) hardware accelerators (i.e. a processor(s) or other hardware specifically designed for AI applications that can be used alongside a main processor).

The processing unit 12 can be connected to a memory unit 14 that can store data, information and/or signals for use by the processing unit 12 in executing or performing the techniques described herein. For example the memory unit 14 can store image frames obtained by the multi-channel imaging device 8, and/or store the image frames after alignment by the processing unit 12. In some implementations the memory unit 14 stores computer-readable code that can be executed by the processing unit 12 so that the processing unit 12 performs one or more functions, including the techniques described herein. The memory unit 14 can comprise any type of non-transitory machine-readable medium, such as cache or system memory including volatile and non-volatile computer memory such as random access memory (RAM), static RAM (SRAM), dynamic RAM (DRAM), read-only memory (ROM), programmable ROM (PROM), erasable PROM (EPROM) and electrically erasable PROM (EEPROM), and the memory unit 14 can be implemented in the form of a memory chip, an optical disk (such as a compact disc (CD), a digital versatile disc (DVD) or a Blu-Ray disc), a hard disk, a tape storage solution, or a solid state device, including a memory stick, a solid state drive (SSD), a memory card, etc.

The user interface component(s) 16 may be provided that includes one or more components that enables a user of the system 2 and/or apparatus 6 (e.g. the subject 4 or another party) to input information, data and/or commands into the system 2 and/or apparatus 6, and/or enables the apparatus 6 to output information or data to the user. For example, the user interface components 16 can include a display screen for displaying one or more image frames of the subject, before and/or after the image frames are aligned according to the techniques described herein. A display screen or other visual display element may also or alternatively display the result of any spectral analysis on the aligned image frames. The user interface components 16 can comprise any suitable input component(s), including but not limited to a keyboard, keypad, one or more buttons, switches or dials, a mouse, a track pad, a touchscreen, a stylus, a camera, a microphone, etc., and/or the user interface components 16 can comprise any suitable output component(s), including but not limited to a display screen, one or more lights or light elements, one or more loudspeakers, a vibrating element, etc.

The multi-channel imaging device 8 is provided to obtain a sequence of image frames of a subject 4. The multi-channel imaging device 8 comprises a plurality of light detection channels that are each responsive to light in a respective spectral band. Each detection channel outputs a respective sequence of frames of the subject. The multi-channel imaging device 8 in FIG. 1 comprises a first light detection channel 18 that is responsive to light in a first spectral band and a second light detection channel 20 that is responsive to light in a second spectral band. Thus, the first light detection channel 18 outputs a first sequence of image frames formed from incident light in the first spectral band, and the second light detection channel 20 outputs a second sequence of image frames formed from incident light in the second spectral band.

The first and second spectral bands are non-overlapping, i.e. the first and second spectral bands cover separate ranges of wavelengths. Optionally, the multi-channel imaging device 8 can comprise at least a third light detection channel that is responsive to light in a third spectral band to output a third sequence of image frames (with the wavelengths covered by the third spectral band being non-overlapping with the wavelengths in the first and second spectral bands).

As described further below, light having a wavelength in the first spectral band is used as 'reference light' in order to identify movement of the subject between image frames. Consequently, the first spectral band is also referred to herein as the "reference band". In preferred embodiments, in particular where the image frames are images of skin, the first spectral band encompasses green light, for example including light having wavelengths of around 535 nanometres (nm) and/or 550 nm. Green light is preferred for skin imaging applications, as images of skin under green light are effective for skin tracking, i.e. for identifying features on the skin such as wrinkles, spots, scars, moles, etc. In these embodiments, the second spectral band may encompass red light or blue light. In the case of red light, the second spectral band can include light having wavelengths of around 615 nm, 630 nm, 650 nm and/or 660 nm. In the case of blue light, the second spectral band can include light having wavelengths of around 450 nm, 465 nm, and/or 480 nm. In alternative embodiments, for example where image frames obtained using green light are also used for spectral analysis of the subject 4, the first spectral band can encompass infra-red (IR) light instead of green light.

In embodiments where the first light detection channel 18 is responsive to green light, and the second light detection channel 20 is responsive to red or blue light (and optionally when the multi-channel imaging device 8 has a third light detection channel responsive to the other one of red and blue light), the multi-channel imaging device 8 may be in the form of a RGB camera or imaging unit.

As noted, each light detection channel 18, 20 obtains or generates a respective sequence of image frames. The image frames are generated according to a common frame rate, i.e. the light detection channels each obtain/generate a respective image frame at the same time, and at the same frame rate. For example, the light detection channels 18, 20 can obtain/generate 30 image frames per second (fps), although other frame rates could be used.

In typical implementations, the multi-channel imaging device 8 is a 'rolling-shutter' type of imaging device, i.e. an imaging device where each light detection channel captures the image frame line-by-line rather than by capturing the entire frame at once.

The one or more light source(s) 10 are provided in order to emit multi-spectral light to illuminate the subject 4 when image frames are to be obtained by the multi-channel imaging device 8. The multi-spectral light comprises at least a first light component having a first illumination wavelength 2 and a second light component having a second illumination wavelength 22. The first illumination wavelength 2 is a wavelength in the first spectral band and the second illumination wavelength 22 is a wavelength in the second spectral band. The one or more light source(s) 10 are configured to emit the first light component and the second light component at the same time (i.e. simultaneously). According to the preferred embodiment of the multi-channel imaging device 8 described above, the first illumination wavelength 2 can be a wavelength of green light, and the second illumination wavelength 22 can be a wavelength of red or blue light.

In some embodiments, the multi-spectral light emitted by the one or more light source(s) 10 further comprises at least a third light component having a third illumination wavelength 23 that is in a third spectral band. For example, where the second illumination wavelength 22 is a wavelength of red light, the third illumination wavelength 23 can be a wavelength of blue light, or vice versa.

In some embodiments, the one or more light source(s) 10 may be configured to selectively emit multiple light components having respective illumination wavelengths within a particular spectral band. In these embodiments, the light source(s) 10 emit the light components having different illumination wavelengths within a particular spectral band at different times (e.g. the light source(s) 10 alternate between emitting two or more illumination wavelengths within a particular spectral band). While light components within a particular spectral band are alternated, it will be appreciated that the light source(s) 10 can continue to emit a light component in another spectral band. For example, the light source(s) 10 can emit a first light component within a first spectral band having a wavelength of 535 nm (i.e. green light), and the light source(s) 10 can alternately switch between emitting a red light component in a second spectral band having a wavelength of 615 nm, and another red light component having a wavelength of 630 nm.

In some embodiments, the one or more light source(s) 10 comprises a respective light source 10 for each light component that is to be emitted. Alternatively, the one or more light source(s) 10 can comprise a single light source that can be controlled to emit multiple light components having respective illumination wavelengths. In some embodiments, the required illumination wavelengths can be achieved using respective colour filters.

The one or more light sources 10 may be light emitting diodes (LEDs) or diode lasers, for example. As noted, each light source 10 may be configured to emit light at specific wavelengths or may be controllable to emit light at varying wavelengths.

In the embodiment shown in FIG. 1, the apparatus 6, the multi-channel imaging device 8 and the one or more light source(s) 10 are separate from each other. Therefore, although not shown in FIG. 1, suitable communication circuitry or communication components may be provided to enable control signals and other information (e.g. data representing image frames obtained by the multi-channel imaging device 8) to be communicated to/from the apparatus 6. Thus, communication circuitry or communication components can be provided to enable a data connection and/or data exchange between the apparatus 6, the multi-channel imaging device 8/imaging unit and/or the one or more light source(s) 10/illumination unit, depending on the implementation. The connection may be direct or indirect (e.g. via the Internet), and thus the communication circuitry or communication components can enable a connection between the apparatus 6 and the multi-channel imaging device 8/imaging unit and/or the one or more light source(s) 10/illumination unit via a network (such as the Internet), or directly between the apparatus 6 and the multi-channel imaging device 8/imaging unit and/or one or more light source(s) 10/illumination unit, via any desirable wired or wireless communication protocol. For example, the communication circuitry or communication components can operate using WiFi, Bluetooth, Zigbee, or any cellular communication protocol. In the case of a wireless connection, the communication circuitry or communication components (and thus apparatus 6 and multi-channel imaging device 8/imaging unit and one or more light source(s) 10/illumination unit) may include one or more suitable antennas for transmitting/receiving over a transmission medium (e.g. the air). Alternatively, in the case of a wireless connection, the communication circuitry or components may include means (e.g. a connector or plug) to enable the communication circuitry or components to be connected to one or more suitable antennas external to the apparatus 6 and multi-channel imaging device 8/imaging unit and one or more light source(s) 10/illumination unit for transmitting/receiving over a transmission medium (e.g. the air).

It will be appreciated that a practical implementation of the system 2 may include additional components to those shown in FIG. 1. For example, the system 2 may include one or more power supplies for the various components of the system 2, such as batteries, or components for enabling the system 2, and/or parts of the system 2, to be connected to a mains power supply.

Although in the embodiment illustrated in FIG. 1 the multi-channel imaging device 8 and the one or more light source(s) 10 are shown as being separate from the apparatus 6, it will be appreciated that in alternative embodiments one or both of the multi-channel imaging device 8 and the one or more light source(s) 10 can be integrated with, or be part of, the apparatus 6. In embodiments where the multi-channel imaging device 8 is separate from the apparatus 6, the multi-channel imaging device 8 can be considered to be part of an imaging unit that can comprise one or more other components or circuitry for enabling the operation of the multi-channel imaging device 8 (e.g. a power source, control circuitry, etc.). Likewise, in embodiments where the one or more light source(s) 10 are separate from the apparatus 6, the light source(s) 10 can be considered to be part of an illumination unit that can comprise one or more other components or circuitry for enabling the operation of the one or more light source(s) 10 (e.g. a power source, control circuitry, etc.).

For example, the apparatus 6 can be in the form of, or be part of, an electronic device such as a smartphone, tablet, smart watch, laptop, computer, server, etc. Embodiments where the apparatus 6 and the multi-channel imaging device 8 are integrated together include where the apparatus 6 is a smartphone, tablet or other device that typically includes an imaging unit. In these embodiments, the one or more light source(s) 10 can be, or correspond to, a controllable 'camera flash' light source(s). Alternatively, the one or more light source(s) 10 can be provided in a separate component or device that can be connected to and controlled by the smart phone/tablet/laptop/etc. to emit the required multi-spectral light.

Briefly, according to the techniques described herein, the processing unit 12 receives sequences of image frames from each of the light detection channels 18, 20 that were obtained while the one or more light source(s) 10 illuminated the subject 4 with light of the appropriate illumination wavelengths, processes the first sequence of frames (i.e. provided by the first light detection channel 18) to calculate motion vectors for each frame, and align the frames in the second (and any other) sequence of frames according to the calculated motion vectors. Each motion vector represents a movement of the subject 4 between frames in the first sequence. Thus, aligning the frames according to the motion vectors means that the subject is aligned across the frames in the second (and any other) sequences.

Figure 2:
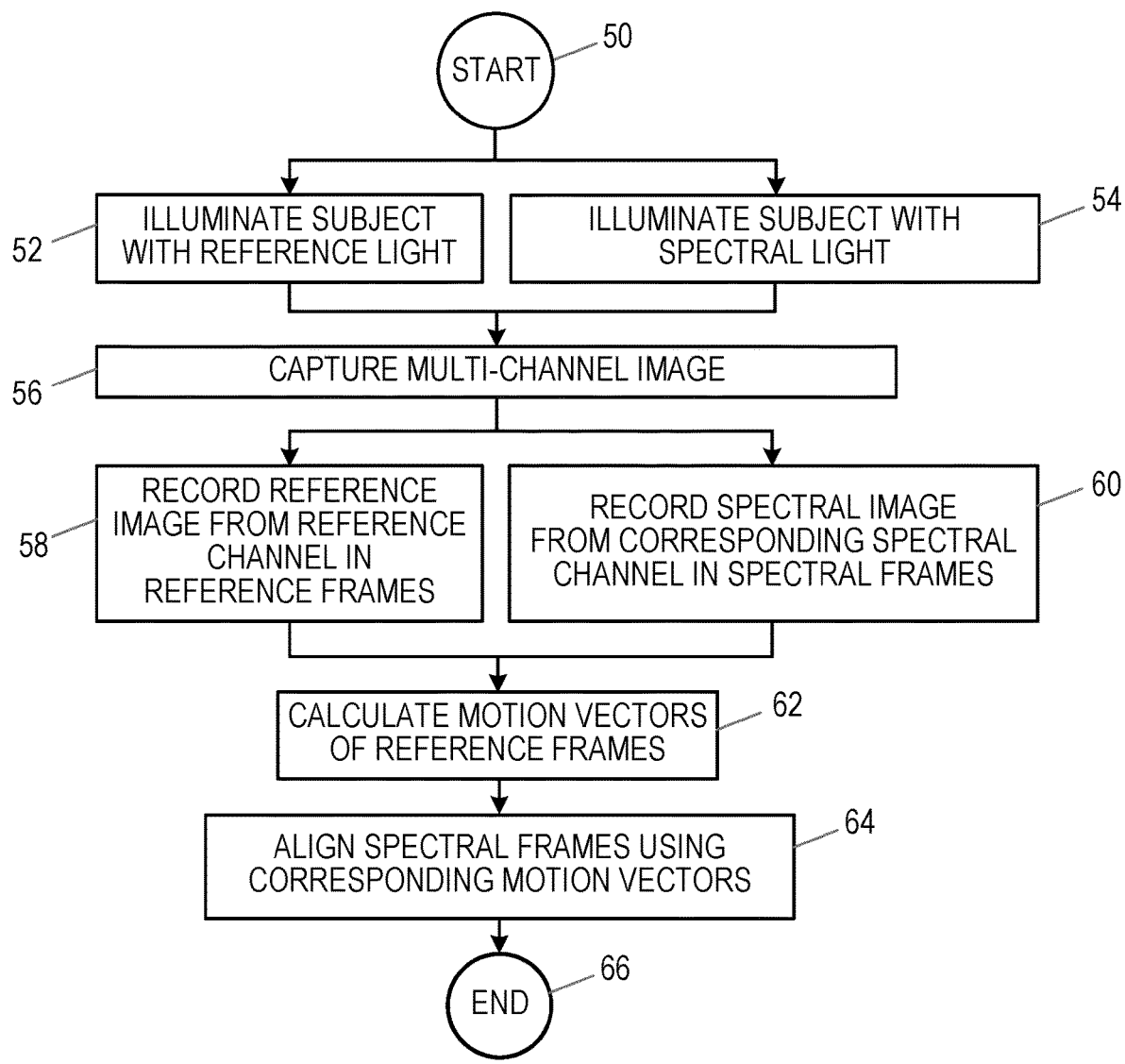
FIG. 2 is a flow chart illustrating a method of aligning image frames according to an embodiment of the techniques described herein.

The flow chart in FIG. 2 illustrates a method of aligning image frames according to an embodiment of the techniques described herein. The method starts at step 50. In step 52 the subject 4 is illuminated with the first light component (i.e. the reference light). At the same time, in step 54 the subject 4 is illuminated with the second light component (e.g. red light), and any other desired light components in spectral bands other than the first spectral band. As described further below, the first light component and/or second light component (and/or any other light components) may be pulsed, so the specific light components illuminating the subject 4 at any particular time instant may vary. In particular embodiments, the rate at which the light is pulsed is higher, or much higher, than the frame rate of the multi-channel imaging device 8.

In step 56, which occurs while light is illuminating the subject 4 according to steps 52 and 54, the multi-channel imaging device 8 is used to capture one or more image frames. That is, each light detection channel 18, 20 in the multi-channel imaging device 8 generates one or more image frames from the incident light.

Then, in step 58, the one or more image frames generated by the first light detection channel 18 in the multi-channel imaging device 8 are stored for subsequent processing. The image frame(s) generated by the first light detection channel 18 are also referred to herein as "reference frames". At the same time as step 58, in step 60, the one or more image frames generated by the second light detection channel 20 (and any further light detection channels) in the multi-channel imaging device 8 are stored for subsequent processing. The image frame(s) generated by the second light detection channel 20 (and any other non-first light detection channel) are also referred to herein as "spectral frames", since after alignment these frames can be spectrally analysed to determine one or more properties of the subject 4 in the images.

The method then passes to step 62 in which the obtained reference frames are processed to calculate a motion vector for each reference frame that represents a movement of the subject 4 in the reference frame relative to the previous reference frame. Step 62 can comprise using conventional techniques for comparing multiple reference frames to identify landmarks or other significant features in the reference frames (e.g. edges of objects/subjects), and to determine the movement of those landmarks or features between the reference frames. That movement can be represented as a motion vector indicating how the subject 4 has moved between the reference frames. Those skilled in the art will be aware of various techniques that can be used to implement step 62, including Farnebäck's optical flow for motion estimation (e.g. as described in "Two-Frame Motion Estimation Based on Polynomial Expansion" by Gunnar Farnebäck), and other optical flow techniques, and details are not provided herein.

Next, in step 64, the spectral frames (i.e. the sequence of image frames output by the second light detection channel 20) are aligned based on the motion vectors determined in step 62. That is, for a particular spectral frame, the motion vector determined for the corresponding reference frame (i.e. the reference frame generated by the first light detection channel 18 at the same time as the particular spectral frame generated by the second light detection channel 20) is applied to the particular spectral frame to align that spectral frame with the previous spectral frame. This is repeated for each spectral frame to provide an aligned sequence of spectral frames in which the subject 4 is in the same position in each of the frames.

In more detail, motion estimation in step 62 results in a motion vector, so for each reference frame the amount of (local) displacement is known. These displacements now need to be superimposed onto the spectral frames. Since the sequence(s) of spectral frames and the reference frames are acquired simultaneously by the same multi-channel imaging device 8, they are perfectly mapped onto each other. The calculated motion vector is directly mapped through the mapping function and applied to the spectral image(s). As a result, the sequence(s) of spectral images will be properly aligned.

The method ends at step 66.

In some embodiments, the one or more light source(s) 10 are controlled to provide pulses of light that include light components with different illumination wavelengths. For example, the one or more light source(s) 10 can be controlled to follow the light pulse pattern below:

Light pulse 1: each of Red1, Blue1 and Green light are generated simultaneously;
Light pulse 2: each of Red2, Blue2 and Green light are generated simultaneously; and
Light pulse 3: each of Red3, Blue3 and Green light are generated simultaneously.

| The specific illumination wavelengths of these light components can be as follows: | |
|---|---|
| Red1 | 615 nm |
| Blue1 | 450 nm |
| Red2 | 630 nm |
| Blue2 | 465 nm |
| Red3 | 660 nm |
| Blue3 | 480 nm |
| Green (reference) | 535 nm |

In a specific example, each light pulse (light pulse 1, light pulse 2, light pulse 3, etc.) can have a duration of 2.8 milliseconds (ms). Further, each light component can have a colour temperature and luminance set so that the pulsing light is perceived by a user and/or the subject 4 as constant white light, without flickering or colour shifting being perceived.

When the multi-channel imaging device 8 is a rolling-shutter RGB imaging device with a frame rate of 30 fps, the light pulses produce around 12 bright and dark bands in each image frame output by the red, green and blue light detection channels. The image frames output by the green light detection channel are used to calculate the motion vectors for each image frame as described above in step 68, and these motion vectors are applied to the image frames output by the red light detection channel and the blue light detection channel to align the subject 4 in the image frames.

To enable subsequent spectral analysis of the image frames, the 'banded' image frames from each light detection channel (i.e. the image frames including 12 bright and dark bands) can be decomposed into 7 separate wavelength-specific spectral image frames (i.e. one wavelength-specific spectral image frame per wavelength of light included in the light pulses).

In a further embodiment, to improve the spectral analysis, the effect of ambient light has to be removed from the image frames. In that case, the above light pulse pattern can be modified to include a 'light pulse' where no light is emitted by the one or more light source(s) 10 and the multi-channel imaging device 8 generates image frames from incident ambient light. For example, the one or more light source(s) 10 can be controlled to follow the light pulse pattern below:

Light pulse 1: each of Red1, Blue1 and Green light are generated simultaneously;
Light pulse 2: each of Red2, Blue2 and Green light are generated simultaneously;
Light pulse 3: each of Red3, Blue3 and Green light are generated simultaneously; and
Light pulse 4: light source(s) 10 off, ambient light only.

Again, each light pulse (light pulse 1, light pulse 2, light pulse 3, light pulse 4) can have a duration of 2.8 ms. Further, each light component can have a colour temperature and luminance set so that the pulsing light is perceived by a user and/or the subject 4 as constant white light, without flickering or colour shifting being perceived.

When the multi-channel imaging device 8 is a rolling-shutter RGB imaging device with a frame rate of 30 fps, the four light pulses produce around 12 bright and dark bands in each image frame output by the red, green and blue light detection channels. Alignment of the image frames is performed as before.

To enable subsequent spectral analysis of the image frames, the 'banded' image frames from each light detection channel are decomposed into an ambient light image frame and 7 separate wavelength-specific spectral image frames (i.e. one wavelength-specific spectral image frame per wavelength of light included in the light pulses). The effect of the ambient light can be removed from the wavelength-specific spectral image frames by linear subtraction of the ambient light image frame from each of the wavelength-specific spectral image frames before any spectral analysis is performed on the spectral images.

Figure 3:
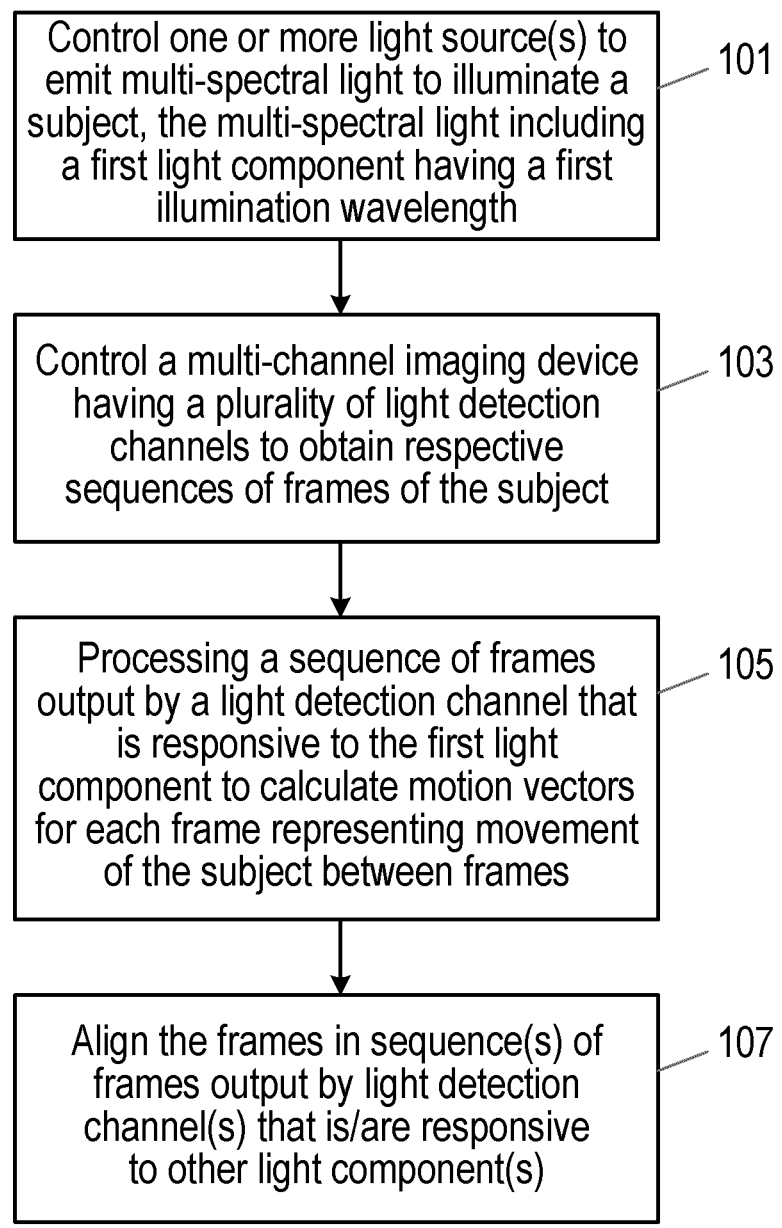
FIG. 3 is a flow chart illustrating a general method of aligning image frames according to the techniques described herein.

The flow chart in FIG. 3 illustrates a general method of aligning image frames according to the techniques described herein. In some embodiments, the method can be performed by the processing unit 12 in the apparatus 6, for example in response to the processing unit 12 executing suitable computer readable code. Such code can be stored in or on the memory unit 14, or on an alternative type of computer readable medium.

In step 101, one or more light sources 10 are controlled to emit multi-spectral light to illuminate the skin of the subject 4. The multi-spectral light comprises at least a first light component having a first illumination wavelength, and a second light component having a second illumination wavelength. The first light component is also referred to as the "reference light" or "reference light component".

In step 103, a multi-channel imaging device 8 is controlled to obtain a sequence of image frames of the skin of the subject 4. Each sequence of image frames is obtained using a respective light detection channel 18, 20 of the multi-channel imaging device 8. Step 103 is performed while the one or more light sources 10 are emitting the multi-spectral light. The multi-channel imaging device 8 comprises a first light detection channel 18 that is responsive to light in a first spectral band to generate a first sequence of frames of the skin of the subject 4, and a second light detection channel 20 that is responsive to light in a second spectral band to generate respective a second sequence of frames of the skin of the subject 4. The first illumination wavelength is within the first spectral band, and the second illumination wavelength is within the second spectral band.

In step 105, the first sequence of frames is processed to calculate motion vectors for each frame. Each motion vector represents a movement of the skin of the subject 4 between frames in the first sequence.

In step 107, the frames in the one or more further sequences of frames according to the corresponding determined motion vectors such that the skin of the subject is aligned across the frames in the second sequence of frames.

In some embodiments, the method further comprises a step of performing a spectral analysis of the skin of the subject 4 using the aligned frames.

In some embodiments, step 101 comprises alternately activating the one or more light sources 10 to emit the multi-spectral light and deactivating the one or more light sources 10. In these embodiments, step 103 comprises controlling the multi-channel imaging device 8 to obtain the sequences of frames while the one or more light sources are activated and deactivated. These embodiments can further comprise the step of processing the sequences of frames to determine an ambient light contribution to the sequences of frames corresponding to ambient light around the subject 4 when the one or more light sources were deactivated. Then, after step 107, the aligned frames in the second sequence of frames can be corrected for the ambient light using the determined ambient light contribution. In some embodiments, the determined ambient light contribution can be subtracted from one or more, or all, of the frames in the second sequence, and optionally also the first sequence of frames. Any spectral analysis to be performed is then performed on the corrected aligned frames.

In some embodiments, the multi-spectral light can include a third light component having a third illumination wavelength that is within a third spectral band, and the multi-channel imaging device 8 can include a third light detection channel that is responsive to light in the third spectral band for generating a third sequence of frames of the subject 4. In these embodiments, the frames in the third sequence of frames can also be aligned according to the corresponding determined motion vectors such that the skin is aligned across the frames in the third sequence of frames. In embodiments where spectral analysis of the skin is performed, the spectral analysis can be performed on one or both of the aligned second sequence of frames and third sequence of frames.

In some embodiments, the multi-channel imaging device 8 is a RGB imaging device. In these embodiments, the first light detection channel can be a green channel of the RGB imaging device, the second light detection channel is one of the blue and red channels of the RGB imaging device, and the third light detection channel is the other one of the blue and red channels.

In some embodiments, the multi-spectral light can include a third (or further) light component having a third (or further) illumination wavelength, with both the second illumination wavelength and the third illumination wavelength being in the second spectral band. In this case, the step of controlling the one or more light sources 10 comprises controlling the one or more light sources 10 to alternately emit the second light component and the third light component (i.e. alternate between the two colours of light in the second spectral band). In these embodiments, the multi-channel imaging device 8 may be a rolling-shutter imaging device having a frame rate that is less than a frequency with which the second light component and the third light component are alternated. Preferably, the bands of different light components in the frames need to be separated and recombined into frames relating to a single light component to enable spectral analysis of the subject 4 to be performed. Therefore, in some embodiments the method further comprises, for the second sequence of aligned frames, decomposing a subset of the aligned frames according to the second illumination wavelength and the third illumination wavelength to provide frame components for the second illumination wavelength and frame components for the third illumination wavelength. Then, for each illumination wavelength in the second spectral band, the frame components for that illumination wavelength are combined to form a composite frame for that illumination wavelength.

In the above embodiment with the multi-spectral light including a third (or further) light component having a third (or further) illumination wavelength in the second spectral band, ambient light correction can also be applied. In this case, step 101 can comprise controlling the one or more light sources to alternately emit the second light component, emit the third light component and not emit light. The method can further comprise aligning the frames in the first sequence of subframes according to the corresponding motion vectors determined in step 105; for each sequence of aligned frames, decomposing a subset of the aligned frames to provide ambient light frame components corresponding to periods of time where the one or more light sources were not emitting light; and combining the ambient light frame components for all sequences of aligned frames to form a composite frame representing ambient light around the subject 4 when the one or more light sources were not emitting light. Finally, each sequence of aligned frames can be corrected for the ambient light using the determined composite frame representing ambient light.

Therefore there is provided an improved method and apparatus for aligning image frames of a subject obtained using multi-spectral light.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for performing spectral analysis of skin of a subject, the method comprising:
   (i) aligning image frames in a sequence of image frames of skin of a subject by:
      controlling one or more light sources to emit multi-spectral light to illuminate the skin, wherein the multi-spectral light comprises at least a first light component having a first illumination wavelength, and a second light component having a second illumination wavelength;
      controlling a RGB imaging device to obtain two or more sequences of image frames of the skin, wherein each sequence of image frames is obtained using a respective light detection channel of the RGB imaging device, wherein the RGB imaging device comprises a first light detection channel that is responsive to light in a first spectral band to generate a first sequence of frames of the skin, and a second light detection channel that is responsive to light in a second spectral band to generate a respective a second sequence of frames of the skin, wherein the first illumination wavelength is within the first spectral band, and the second illumination wavelength is within the second spectral band;
      processing the first sequence of frames to calculate motion vectors for each frame, wherein each motion vector represents a movement of the skin between frames in the first sequence;
      aligning the frames in the second sequence of frames according to the corresponding determined motion vectors such that the skin is aligned across the frames in the second sequence of frames; and
   (ii) performing spectral analysis of the skin using the aligned second sequence of frames to determine one or more properties of the skin;
   wherein the first light component is a green light component, the first spectral band is a green spectral band, the second light component is one of a red light component and a blue light component, and the second spectral band is a corresponding one of a red spectral band and a blue spectral band.

2. A method as claimed in claim 1, wherein the RGB imaging device is controlled to obtain the sequences of frames while the one or more light sources are emitting the multi-spectral light.

3. A method as claimed in claim 1, wherein the step of controlling the one or more light sources comprises alternately activating the one or more light sources to emit the multi-spectral light and deactivating the one or more light sources, and wherein the step of controlling the RGB imaging device comprises controlling the RGB imaging device to obtain the sequences of frames while the one or more light sources are activated and deactivated.

4. A method as claimed in claim 3, wherein the method further comprises:

processing the sequences of frames to determine an ambient light contribution to the sequences of frames corresponding to ambient light around the subject when the one or more light sources are deactivated; and correcting the aligned frames in the second sequence of frames for the ambient light using the determined ambient light contribution.

5. A method as claimed in claim 1, wherein the multi-spectral light further comprises a third light component having a third illumination wavelength.

6. A method as claimed in claim 5, wherein
the second light component is the red light component,
the second illumination wavelength is within the red spectral band,
the third light component is a blue light component,
the third illumination wavelength is within the blue spectral band,
the RGB imaging device further comprises a third light detection channel that is responsive to light in the blue spectral band to generate a third sequence of frames of the skin,
wherein, optionally, the step of aligning further comprises aligning the frames in the third sequence of frames according to the corresponding determined motion vectors such that the skin is aligned across the frames in the third sequence of frames; and
wherein, optionally, the step of performing the spectral analysis comprises performing the spectral analysis of the skin using the aligned second sequence of frames and the aligned third sequence of frames.

7. A method as claimed in claim 5, wherein the second illumination wavelength and the third illumination wavelength are both in the second spectral band, and wherein the step of controlling the one or more light sources comprises controlling the one or more light sources to alternately emit the second light component and the third light component.

8. A method as claimed in claim 7, wherein the RGB imaging device is a rolling shutter RGB imaging device having a frame rate that is less than a frequency with which the second light component and the third light component are alternated.

9. A method as claimed in claim 8, wherein the method further comprises, for the second sequence of aligned frames for the second spectral band:
decomposing a subset of the aligned frames according to the second illumination wavelength and the third illumination wavelength to provide frame components for the second illumination wavelength and frame components for the third illumination wavelength; and
for each illumination wavelength in the second spectral band, combining the frame components for said illumination wavelength to form a composite frame for said illumination wavelength.

10. A method as claimed in claim 9, wherein the step of controlling the one or more light sources comprises controlling the one or more light sources to alternately: emit the second light component, emit the third light component and not emit light;
wherein the method further comprises:
aligning the frames in the first sequence of subframes according to the corresponding determined motion vectors;
for each sequence of aligned frames, decomposing a subset of the aligned frames to provide ambient light frame components corresponding to periods of time where the one or more light sources were not emitting light;
combining the ambient light frame components for all sequences of aligned frames to form a composite frame representing ambient light around the subject when the one or more light sources were not emitting light; and
correcting each sequence of aligned frames for the ambient light using the determined composite frame representing ambient light.

11. A computer program product comprising a computer readable medium having computer readable code embodied therein, the computer readable code being configured such that, on execution by a suitable computer or processor, the computer or processor is caused to perform the method of claim 1.

12. An apparatus configured for performing spectral analysis of skin of a subject, the apparatus comprising a processing unit configured to:
(i) align image frames in a sequence of image frames of skin of a subject by:
controlling one or more light sources to emit multi-spectral light to illuminate the skin, wherein the multi-spectral light comprises at least a first light component having a first illumination wavelength, and a second light component having a second illumination wavelength;
controlling a RGB imaging device to obtain two or more sequences of image frames of the skin, wherein each sequence of image frames and each is obtained using a respective light detection channel of the RGB imaging device, wherein the RGB imaging device comprises a first light detection channel that is responsive to light in a first spectral band to generate a first sequence of frames of the skin, and a second light detection channel that is responsive to light in a second spectral band to generate a second sequence of frames of the skin, wherein the first illumination wavelength is within the first spectral band, and the second illumination wavelength is within the second spectral band;
processing the first sequence of frames to calculate motion vectors for each frame, wherein each motion vector represents a movement of the skin between frames in the first sequence;
aligning the frames in the second sequence of frames according to the corresponding determined motion vectors such that the skin is aligned across the frames in the second sequence of frames; and
(ii) perform spectral analysis of the skin using the aligned second sequence of frames to determine one or more properties of the skin;
wherein the first light component is a green light component, the first spectral band is a green spectral band, the second light component is one of a red light component and a blue light component, and the second spectral band is a corresponding one of a red spectral band and a blue spectral band.

13. A system configured for performing spectral analysis of skin of a subject, the system comprising:
an apparatus as claimed in claim 12;
the one or more light sources; and
the RGB imaging device.

* * * * *